US011885363B2

(12) United States Patent
Ramachandran

(10) Patent No.: US 11,885,363 B2
(45) Date of Patent: Jan. 30, 2024

(54) SELF DRILLING SCREW

(71) Applicant: IPH International Pty Ltd, Yatala (AU)

(72) Inventor: Rameshkumara Ramachandran, Yatala (AU)

(73) Assignee: IPH INTERNATIONAL PTY LTD., Yatala (AU)

( * ) Notice: Subject to any disclaimer, the term of this patent is extended or adjusted under 35 U.S.C. 154(b) by 866 days.

(21) Appl. No.: 16/790,946

(22) Filed: Feb. 14, 2020

(65) Prior Publication Data
US 2020/0277980 A1      Sep. 3, 2020

(30) Foreign Application Priority Data
Feb. 28, 2019   (AU) ................................. 2019900653

(51) Int. Cl.
*F16B 25/10* (2006.01)
*E06B 9/02* (2006.01)
*F16B 25/00* (2006.01)
*F16B 35/06* (2006.01)

(52) U.S. Cl.
CPC .............. *F16B 25/103* (2013.01); *E06B 9/02* (2013.01); *F16B 25/0042* (2013.01); *F16B 25/10* (2013.01); *F16B 35/065* (2013.01)

(58) Field of Classification Search
CPC ......................... F16B 25/0042; F16B 25/0084; F16B 25/103; F16B 35/041; F16B 35/065; F16B 25/10; E06B 9/02
USPC ........ 411/386, 387.1, 387.6, 387.7, 411, 424
See application file for complete search history.

(56) References Cited

U.S. PATENT DOCUMENTS

| | | | | |
|---|---|---|---|---|
| 3,288,015 A * | 11/1966 | Hanneman | .......... | F16B 25/0084 408/217 |
| 5,964,560 A * | 10/1999 | Henriksen | .......... | F16B 25/0031 411/404 |
| 6,530,731 B2 * | 3/2003 | Wheeler | .......... | F16B 37/127 411/389 |
| 8,403,972 B2 * | 3/2013 | Hasenbohler | .......... | A61B 17/863 411/411 |
| 8,419,332 B2 * | 4/2013 | Kochheiser | .......... | F16B 5/0275 411/426 |
| 8,430,618 B2 * | 4/2013 | Baer | .......... | F16B 35/041 411/416 |
| 8,511,958 B2 * | 8/2013 | Chang | .......... | F16B 25/103 411/387.7 |
| 10,480,561 B2 * | 11/2019 | Chao | .......... | F16B 25/0084 |
| 2002/0168245 A1 * | 11/2002 | Kuo-Tai | .......... | F16B 25/0015 411/387.1 |
| 2003/0143058 A1 * | 7/2003 | Takahashi | .......... | F16B 35/048 411/387.4 |
| 2011/0293387 A1 * | 12/2011 | Chang | .......... | F16B 25/103 411/387.1 |
| 2012/0294693 A1 * | 11/2012 | Gonciarz | .......... | F16B 25/0063 411/387.1 |
| 2013/0309042 A1 * | 11/2013 | Chao | .......... | F16B 25/0084 411/387.1 |

(Continued)

*Primary Examiner* — Roberta S Delisle
(74) *Attorney, Agent, or Firm* — DUANE MORRIS LLP

(57) ABSTRACT

A self-drilling screw, particularly for use in a security screen employing leveraged clamping. The self-drilling screw comprises a head and a shank. A drill bit is formed at one end of the shank away from the head with a thread extending along the full length of the shank, including the drill bit. The thread on the drill bit increases holding strength.

11 Claims, 5 Drawing Sheets

(56) References Cited

U.S. PATENT DOCUMENTS

2016/0120583 A1* 5/2016 Bales ................ A61B 17/8625
　　　　　　　　　　　　　　　　　　　　606/311
2016/0186795 A1* 6/2016 Schneider ........... F16B 25/0078
　　　　　　　　　　　　　　　　　　　　411/386

* cited by examiner

SELF DRILLING SCREW

FIELD OF THE INVENTION

The present invention relates to the field of engineering and in particular fasteners. Specifically, the invention is an improved screw found to be particularly useful in assembling security screens for windows, doorways, and the like.

BACKGROUND TO THE INVENTION

Various types of screws are known including wood screws, metal screws, coach bolts, batten screws, self-tapping or self-drilling screws, etc. Each has a particular use and is configured with certain features for that use. One particular type of screw used in the fabrication of security screens is a thread-forming screw. A thread-forming screw cuts a thread as it is forced into a pre-drilled hole. In use a pilot hole is drilled and as a separate action the thread-forming screw is driven into the hole.

It is known in other applications to use a self-drilling screw. A prior art self-drilling screw is shown in FIG. 1. It is characterised by a head and a shank. The head may be pan, countersunk, round, or various other variations. The shank terminates in a drill bit that drills a hole in the material being fastened. The shank has a thread along part of the length extending from the head to the drill bit.

Another type of thread-forming screw is used in wood and has self-embedding ribs at the end of the shank. This is sometimes referred to as a bugle head screw. The self-embedding ribs are not actually a drill bit but rather a flute to assist with moving material as the screw bites into the timber. These screws are only useful for soft timbers and require a pilot hole for use in hardwood. They are not useful for metal and therefore cannot be used for security screen assembly.

As mentioned, self-drilling screws are used in the fabrication of security screens. Reference is made to International Patent Application publication number WO96/07006, which describes one such intruder resistant screen, the content of which is incorporated herein by reference. WO96/07006 describes an intruder resistant screen including a frame comprising elongate frame members, each having a channel section engaging a respective corner stake in each end thereof. A woven wire intruder resistant mesh covers an opening enclosed by the frame. There are a plurality of clamping members co-acting with respective screws to thereby clamp the mesh to the frame. The intruder resistant screen described in WO96/07006 is known in the market as the Crimsafe® Security System.

SUMMARY OF THE INVENTION

In one form, although it need not be the only or indeed the broadest form, the invention resides in a screw comprising:
a head and a shank;
a drill bit formed at one end of the shank away from the head; and
a thread extending along the full length of the shank, including the drill bit.

Preferably the head is a pan head or a counter-sunk head.

The head includes a fastening tool engagement portion which may be slot, Philips, hex, or other suitable form of engagement.

The drill bit may be hardened or bi-metal.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

Figure 1:
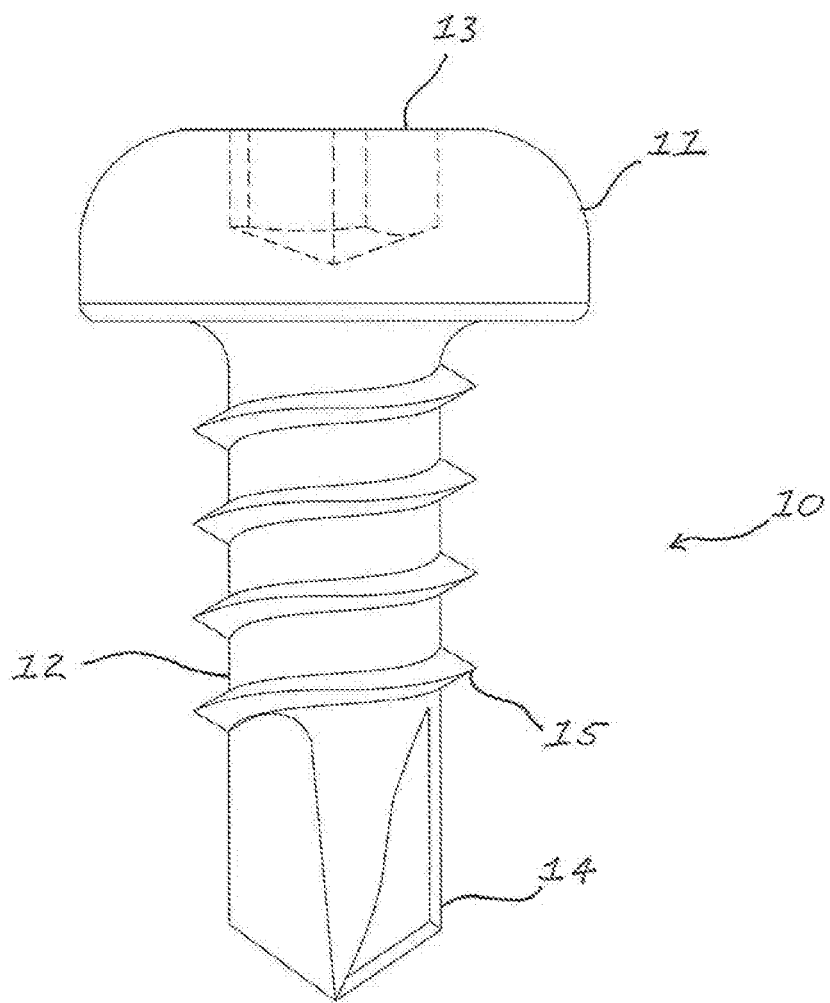
FIG. 1 is a side view of prior art self-drilling screw.

Embodiments of the present invention reside primarily in a self-drilling screw. Accordingly, the elements of the screw have been illustrated in concise schematic form in the drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

Referring to FIG. 1 there is shown a prior art self-drilling screw 10. The self-drilling screw 10 comprises a head 11 and a shank 12. In the embodiment of FIG. 1 the head 11 is a pan head, but other shapes as known in the art are also acceptable. An engagement portion 13 (shown in hidden detail) is formed in the head 11. The engagement portion 13 receives a tool that is used to drive the fastener by rotation. In the embodiment of FIG. 1 the engagement portion is a hex slot.

The shank 12 terminates in a drill bit 14. The drill bit is the same diameter as the shank and, in use, cuts a hole to receive the shank of the self-drilling screw. A thread 15 is formed on the shank between the head 11 and the drill bit 14. The thread 15 sits proud of the shank so as to cut into the material around the hole cut by the drill bit 14.

Figure 2:
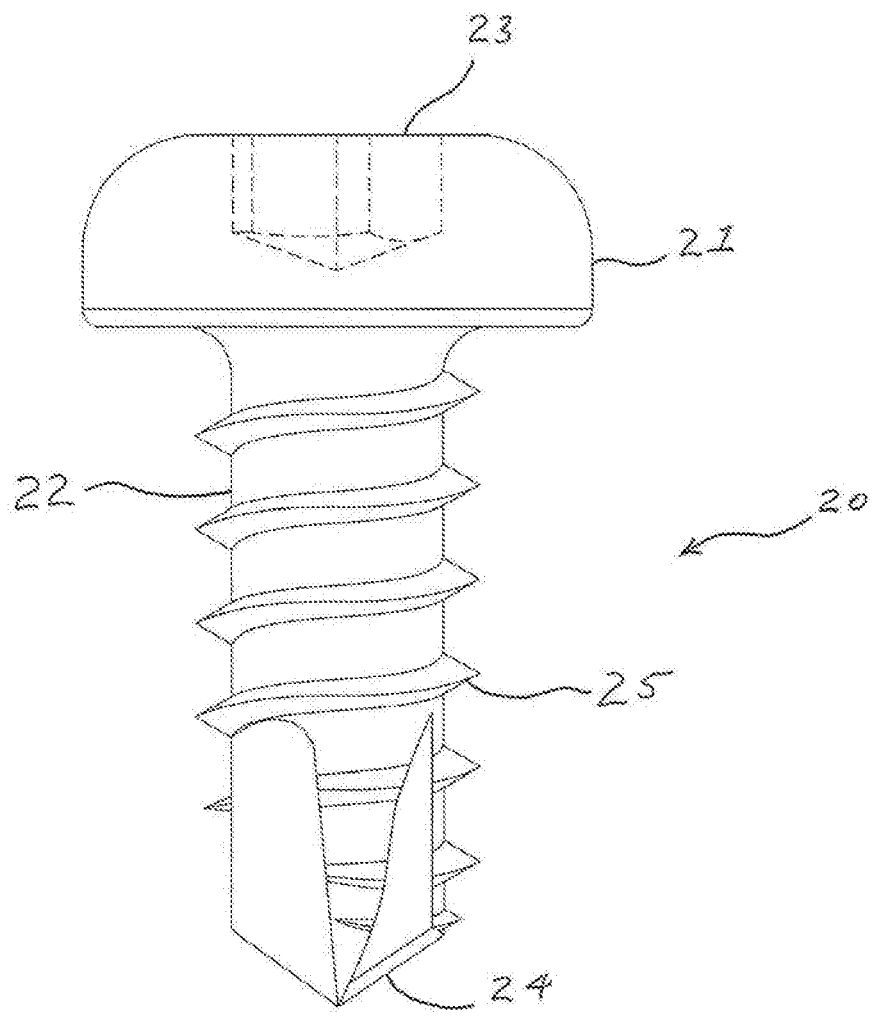
FIG. 2 is a side view of an embodiment of a self-drilling screw according to the invention.

Referring to FIG. 2, there is shown a first embodiment of a self-drilling screw 20. The self-drilling screw 20 comprises a head 21 and a shank 22. In the embodiment of FIG. 2 the head 21 is a pan head, but other shapes as known in the art are also acceptable. The inventor has found that a counter-sunk head may be particularly useful in some applications. An engagement portion 23 (shown in hidden detail) is formed in the head 21. In the embodiment of FIG. 2 the engagement portion is a hex slot, but Phillips, straight slot and other known shapes will also be useful.

The shank 22 terminates in a drill bit 24. The drill bit is the same diameter as the shank and, in use, cuts a hole to receive the shank of the self-drilling screw. It may be made from an alloy, hardened steel or bi-metal. The drill bit 24 may be slightly small than the shank 22, which may increase the holding strength but will increase the force required to use the screw. On the other hand, the drill bit 24 may be slightly larger than the shank 22, which will make the screw easier to insert but may reduce the holding strength. The length of the drill bit 24 relative to the shank 22 may also be varied. A thread 25 is formed on the shank 22 and extends from the head 21 to the end of the shank, including the drill bit 24. The thread 25 sits proud of the shank so as to cut into the material around the hole cut by the drill bit 24.

The self-drilling screw 20 of FIG. 2 differs from the prior art of FIG. 1 in that the thread extends to the end of the shank, including the drill bit 24. This additional length of thread has been found to offer hitherto unexpected advantage for fastening in certain circumstances. One such circumstance is for holding the clamping member to the frame in a security screen, such as that described in international patent publication WO96/07006.

Figure 3:
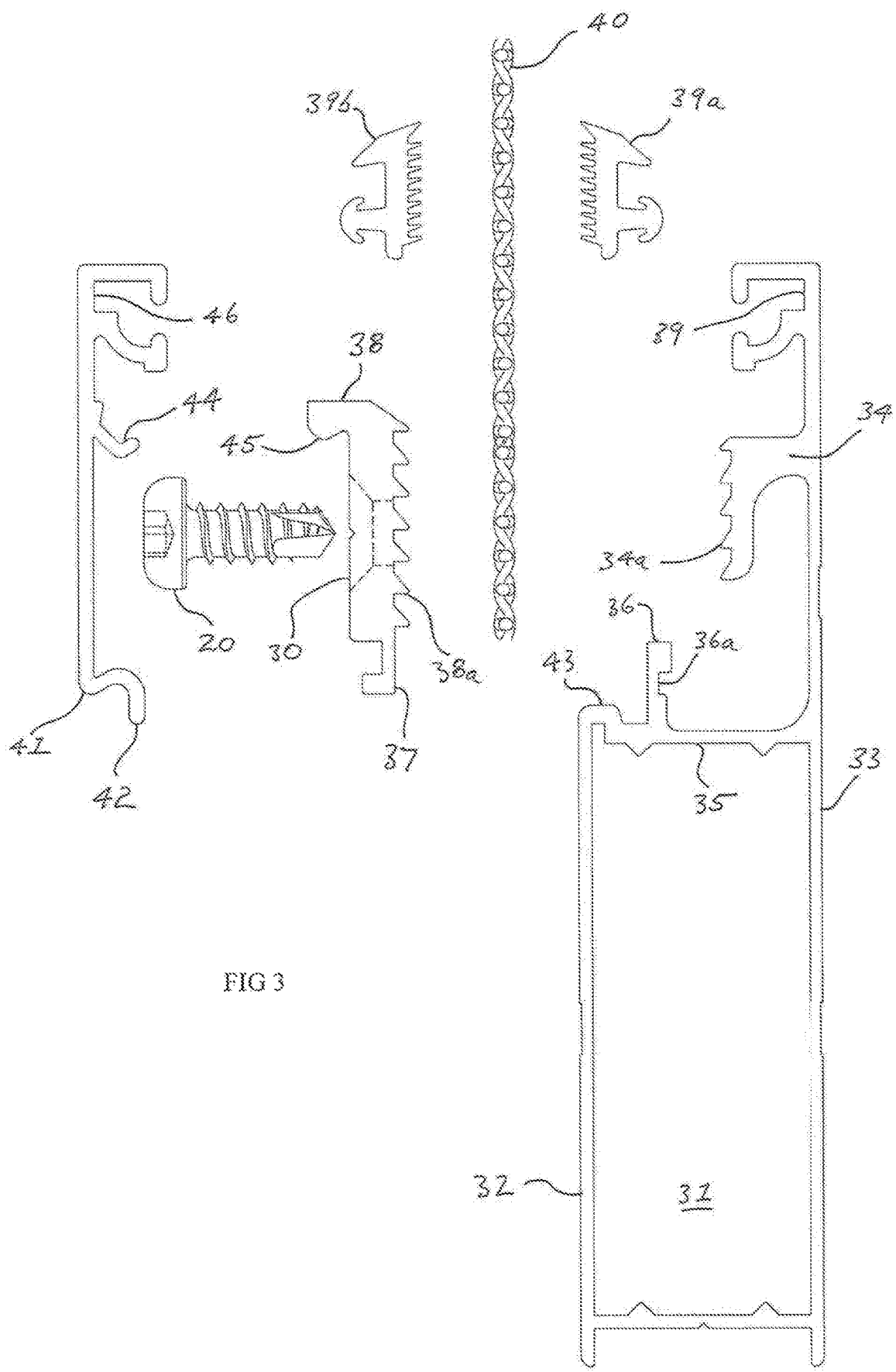
FIG. 3 is an exploded view of an application of the self-drilling screw of FIG. 2.

By way of example, FIG. 3 shows an exploded view of a portion of the frame of a security screen. An elongate frame member 32 comprises a channel section 31. A wall 33 of the channel section 31 extends to form one side of a clamping assembly. A flange 34 extends away from the wall 33 and includes serrated surface 34a. Extending from another wall 35 is a lip 36 having a groove 36a that forms a catch for a hook 37 of a clamp element 38. At an end of wall 33 is a channel 39 that receives a seal element 39a that co-acts with seal element 39b to form a seal to inhibit ingress of moisture along a mesh 40. The clamp element 38 has a serrated surface 38a that is similar to the serrated surface 34a. A hole 30 in the clamp element 38 receives screw 20. A cover 41 has at one side an edge 42 that engages a rim 43 on the frame member 32 and towards an opposite side a hook 44 that engages a clip 45 on the clamp element 38. At an edge of the cover 41 is a channel 46 that receives seal element 39b.

Figures 4, 5:
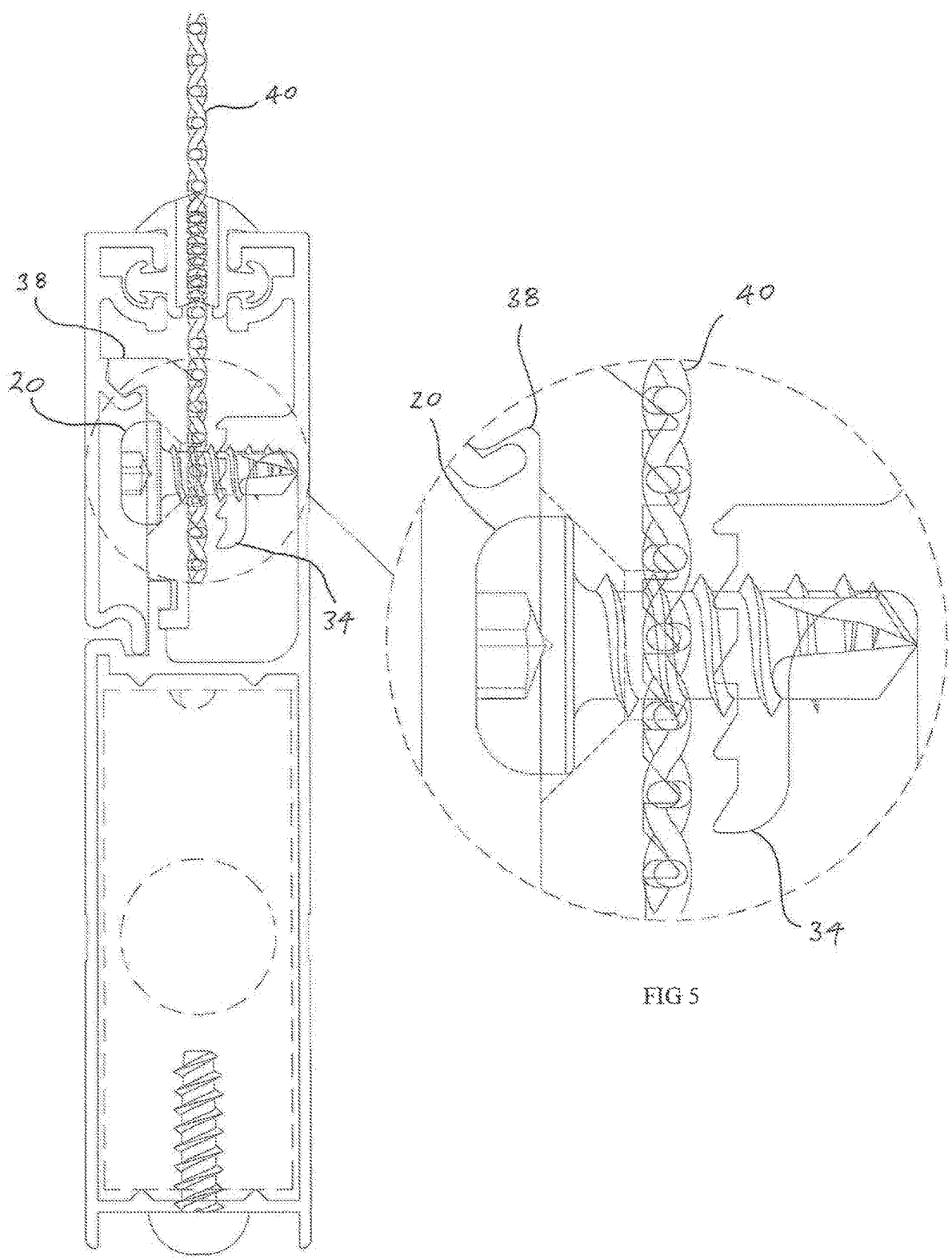
FIG. 4 is an assembled view of the frame shown in FIG. 3.
FIG. 5 is an enlarged view of a portion of FIG. 4.

The assembled frame and clamp is shown in FIG. 4. As can be seen, the screw 20 fastens the clamp element 38 to the flange 34 thus clamping the mesh 40 with a leveraged clamping action. As seen most clearly in FIG. 5, the thread 25 of the screw 20 holds throughout the length of the shank 22, thus improving holding strength.

Figure 6:
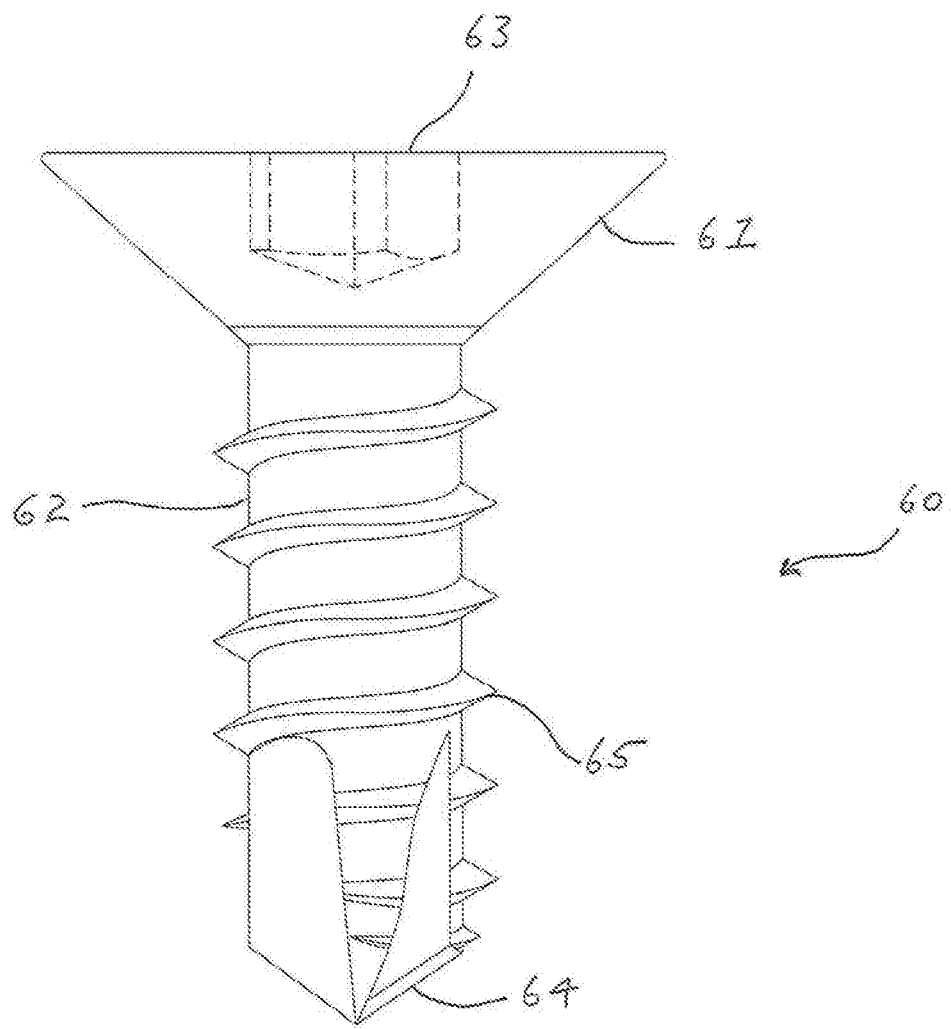
FIG. 6 is a side view of a second embodiment of a self-drilling screw according to the invention.

An alternate embodiment of the screw of FIG. 2 is shown in FIG. 6. The self-drilling screw 60 comprises a head 61 and a shank 62. In the embodiment of FIG. 6 the head 61 is a countersunk head. An engagement portion 63 (shown in hidden detail) is formed in the head 61. The shank 62 terminates in a drill bit 64. The drill bit 64 may be slightly smaller or slightly larger in diameter than the shank 62. The length of the drill bit 64 relative to the shank 62 may also be varied. A thread 65 is formed on the shank 62 and extends from the head 61 to the end of the shank, including the drill bit 64. The thread 65 sits proud of the shank so as to cut into the material around the hole cut by the drill bit 64.

In testing conducted on the embodiment shown in FIG. 2 for the application of FIG. 5, a 14% strength increase was measured compared to the prior art screw. The screw 20 has the additional advantage of greatly streamlining the fabrication process for security screens. Typically, these screens are fabricated on site. The prior art process is to drill holes for each screw but the screw of FIG. 2 can be inserted without any preparation, thus making assembly much quicker. Some advantages of using the screw of FIG. 2 compared to the screw of FIG. 1 are: stronger product; faster assembly; less tools required. As a result, a person assembling a screen has less incidence of repetitive strain injury. There is also less chance of scratching due to a drill slipping and there is less waste material, such as metal filings from drilling.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A self-drilling screw comprising:
   a head and a shank;
   a drill bit formed at one end of the shank away from the head; and
   a thread extending along the full length of the shank and the drill bit such that the thread terminates at a distal end of the drill bit;
   wherein the thread extending along the drill bit decreases in pitch as it moves away from the head.

2. The self-drilling screw of claim 1, wherein the shank has the same diameter throughout the length of the shank.

3. The self-drilling screw of claim wherein the drill bit has a larger diameter than the remainder of the shank.

4. The self-drilling screw of claim wherein the drill bit has a smaller diameter than the remainder of the shank.

5. The self-drilling screw of claim 1, wherein the head is a pan head.

6. The self-drilling screw of claim 1, wherein the head is a counter-sunk head.

7. The self-drilling screw of claim wherein a fastening tool engagement portion is formed in the head.

8. The self-drilling screw of claim formed from hardened metal.

9. The self-drilling screw of claim 1, formed from bi-metal.

10. The self-drilling screw of claim 1, formed from alloy.

11. In combination:
    a security screen frame haying a flange extending from a wall of a channel section;
    a clamp haying a clamp element complementary to the flange;
    a mesh for capture between the clamp element and the flange; and
    a self-drilling screw that fastens the clamp element to the flange and thereby capture the mesh.

* * * * *